United States Patent

Gluf, Jr.

[11] Patent Number: 5,680,883
[45] Date of Patent: Oct. 28, 1997

[54] MANIFOLD AND VALVE ASSEMBLY AND FILTER/GASKET THEREFOR

[75] Inventor: Carl G. Gluf, Jr., Chesterfield, Mich.

[73] Assignee: Eaton Corporation, Cleveland, Ohio

[21] Appl. No.: 639,916

[22] Filed: Apr. 24, 1996

[51] Int. Cl.$^6$ .................................................. R16K 51/00
[52] U.S. Cl. ........................................... 137/884; 137/550
[58] Field of Search ..................................... 137/884, 550

[56] References Cited

U.S. PATENT DOCUMENTS 3,701,360  10/1972  Morrison ........................... 137/550 X
4,210,034  7/1980  Younger ............................. 137/884 X
4,836,242  6/1989  Coffre et al. ...................... 137/550 X Primary Examiner—John Fox
Attorney, Agent, or Firm—Roger A. Johnston

[57] ABSTRACT

A filter/gasket formed of woven screen material has a bead rim formed of elastomeric material molded through the screen to form oppositely disposed bead portions at a common location on the screen grid. A manifold set of servo actuated valves is ported on the manifold with the filter/gasket disposed for sealing between a separator plate and the manifold and filtering flow upon energization of any of the valves.

7 Claims, 4 Drawing Sheets

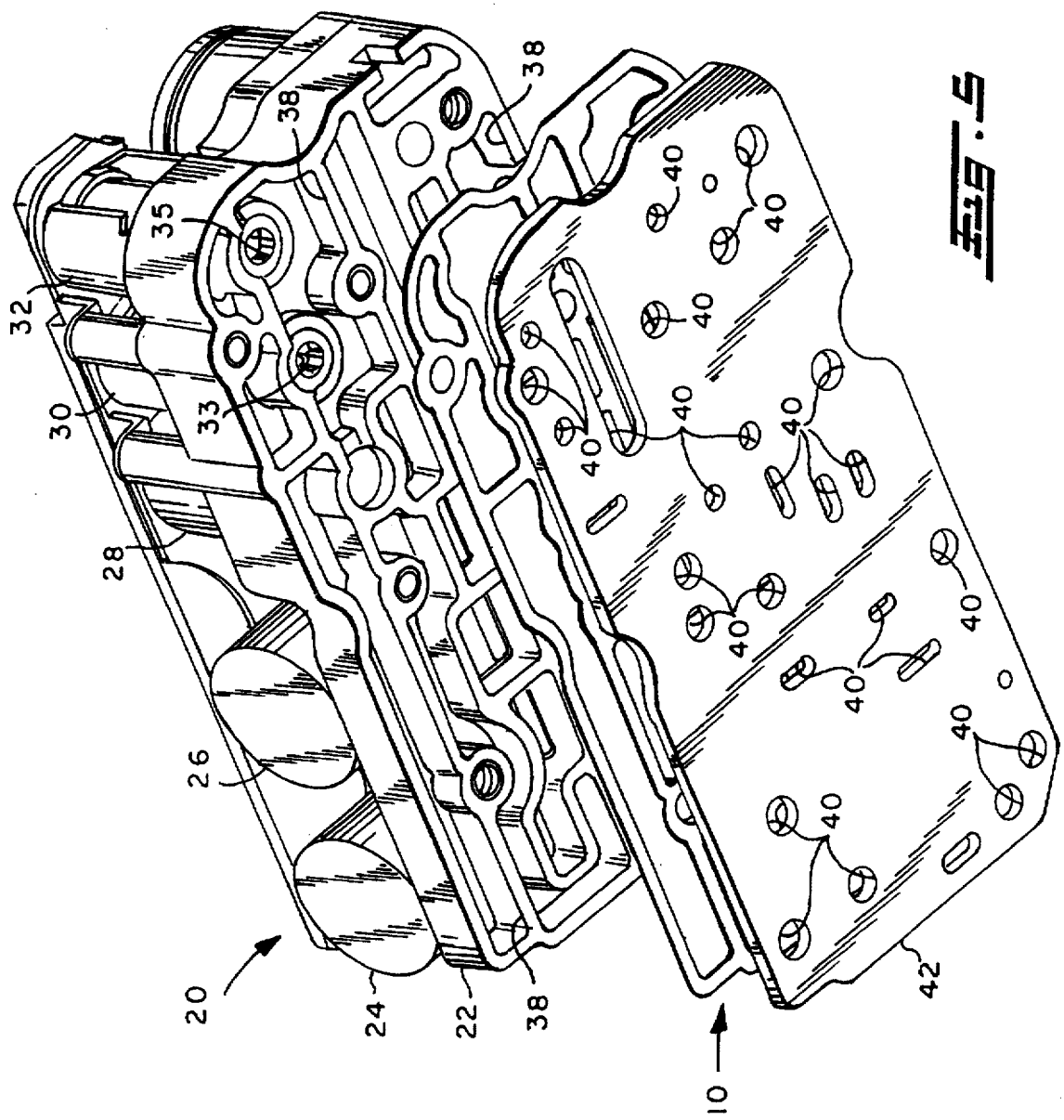

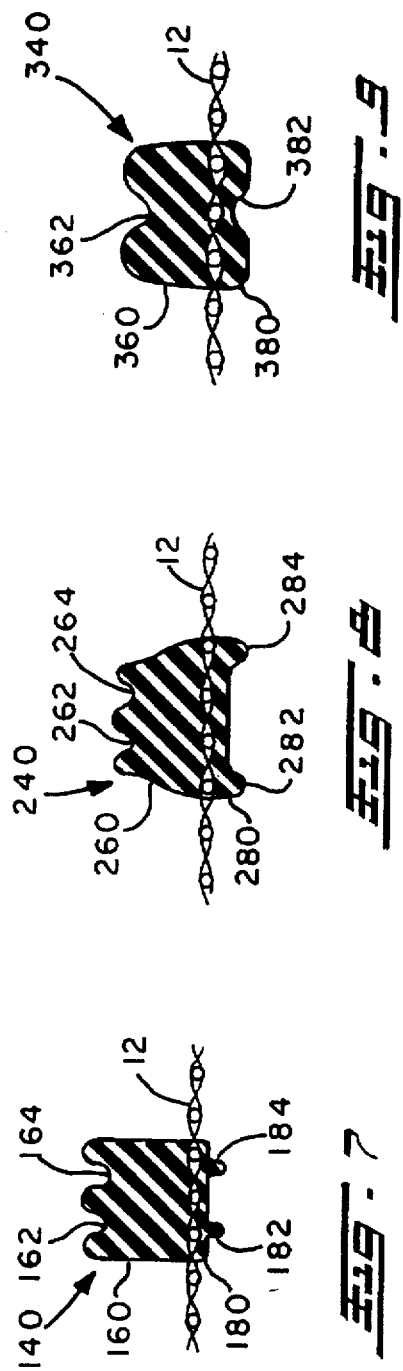
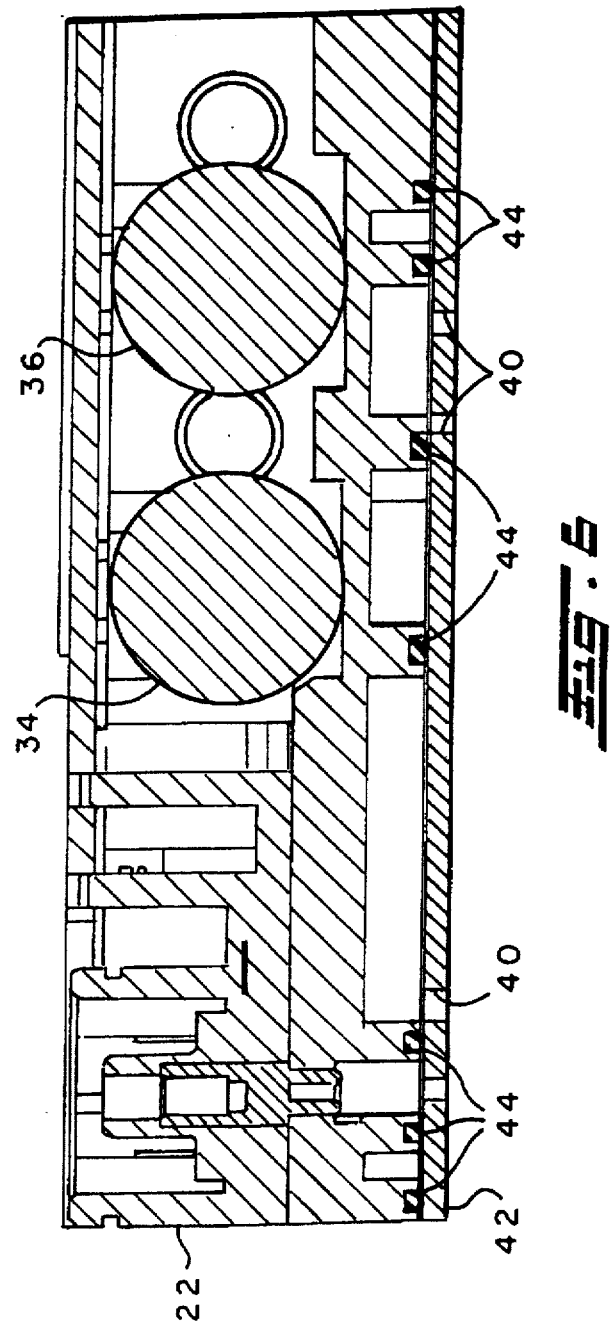

MANIFOLD AND VALVE ASSEMBLY AND FILTER/GASKET THEREFOR

BACKGROUND OF THE INVENTION

The present invention relates to combining the functions of a gasket and a fluid flow filter and particularly as it relates to sealing an enclosure and filtering flow of hydraulic fluid such as is encountered in automatic power transmissions for automotive applications.

State of the art automatic transmissions for automotive applications currently employ electronics including a microcomputer for operating servo motor actuated valve for controlling flow of the hydraulic fluid for effecting shifting functions in the automatic transmission. In such electronically controlled automatic power transmissions, it is current design practice to mount the solenoid valve operators on a mounting block or manifold which has numerous inlet and outlet passages for channeling flow upon selected valve operation to individual discrete flow passages in the transmission hydraulic circuits.

In order to protect the valve operators from contamination and foreign particles which may accumulate in the transmission hydraulic fluid, it has been found desirable to provide a filtering function between the solenoid valve manifold and the transmission hydraulic circuits. Heretofore, individual seal rings and screens were provided at each of the inlet and outlet passages for the respective individual servo actuated valves and thus the assembly of the manifold and valve block onto the automatic transmission was rendered costly by virtue of the need to install numerous extra parts and also became difficult to assemble. Therefore, it has been desired to find a way or means for providing a simple and low cost filtering and sealing function about the valve ports for servo actuated valves, particularly where such valves are mounted on a manifold for use in controlling an automatic power transmission.

SUMMARY OF THE INVENTION

It is an object of the present invention to provide a combined filtering and sealing function for a fluid flow passage and filtering the flow therethrough and particularly for such functions as they relate to the sealing and filtering of hydraulic fluid in a control circuit.

It is a further object of the present invention to provide a combination manifold and valve assembly having electrically actuated valves mounted on a manifold block with the inlet and outlet passages for the valves provided in the block which is attached to a hydraulic circuit to be controlled with a unitary combination filter/gasket disposed between the manifold and a circuit to be controlled.

It is a further object of the present invention to provide a filter/gasket for sealing and filtering hydraulic fluid having a grid of woven screen material with a bead formed of elastomeric material extending through the grid.

The present invention provides a one piece filter/gasket for filtering hydraulic fluid flow between a motorized valve manifold block and a cover or spacer plate attached thereto for sealing and filtering hydraulic fluid upon selected actuation of the valves on the manifold. The present invention is particularly applicable to manifolded motor actuated valves employed in controlling hydraulic fluid flow in automatic power transmissions for automotive applications.

BRIEF DESCRIPTION OF THE DRAWINGS

FIG. 5 is a view similar to FIG. 4 looking upwardly from the bottom;

FIG. 6 is a section view of the assembled embodiment of FIG. 4;

FIG. 7 is a view similar to FIG. 3 of an alternate embodiment;

FIG. 8 is a view similar to FIG. 3 of another embodiment; and

FIG. 9 is a view similar to FIG. 3 of a further embodiment.

DETAILED DESCRIPTION

Figure 1:
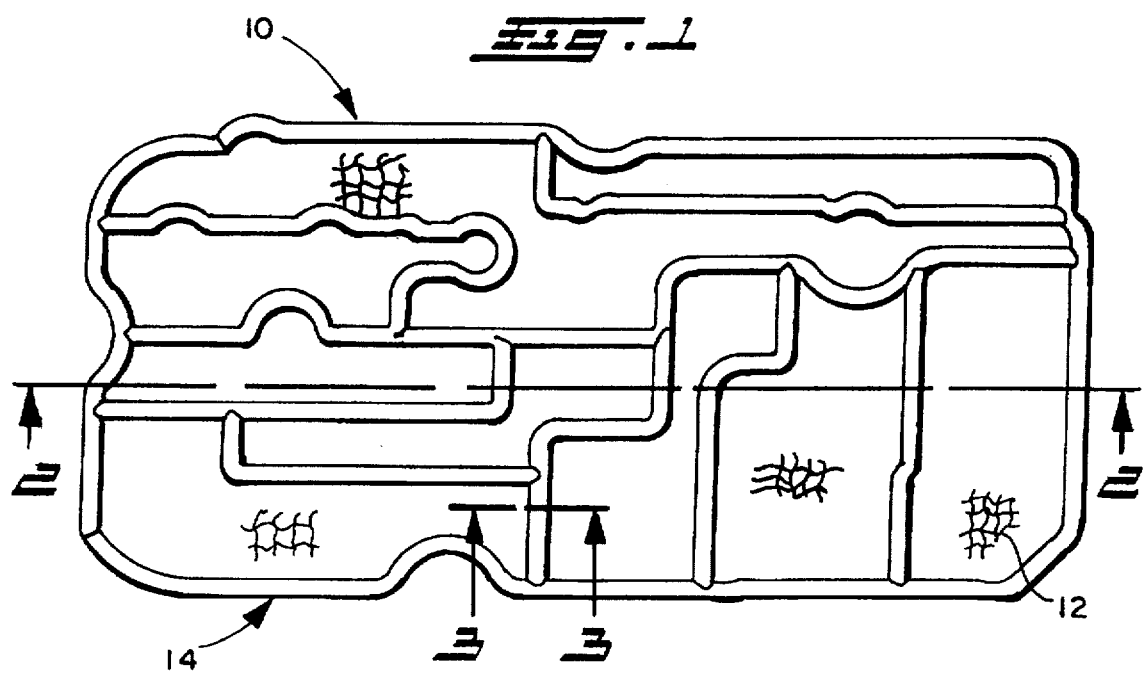
FIG. 1 is a plan view of the filter/gasket of the present invention.
Figure 2:
FIG. 2 is a section view of the embodiment of FIG. 1.
Figure 3:
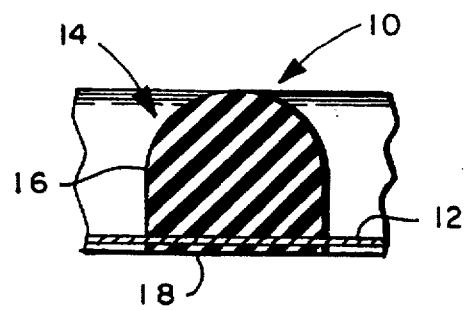
FIG. 3 is a section view taken along section indicating lines 3—3 of FIG. 1.

Referring to FIGS. 1–3, the filter/gasket of the present invention is indicated generally at 10 and has a grid 12 formed of screen material having a relatively fine mesh. In the present practice of the invention for automotive transmission hydraulic fluid, screen material having mesh openings in the range of 125–160 microns has been found satisfactory. The woven screen material may comprise stainless steel or polyester plastic or other suitable material.

A bead is formed integrally on the grid 12 by flowing uncured elastomeric material through the grid and shaping the elastomeric material in a mold followed by curing and removal from the mold. In the present practice invention for automotive transmission hydraulic fluid applications, the bead is formed of silicon or fluorocarbon elastomer having a hardness in the range 72–78 as measured on the Shore "A" in the cured state. It will be understood that the elastomeric material may be introduced into the mold by injection molding or by the use of preforms and compression molding. The filter grid 12 may either by cut to the desired shape and inserted in the mold or, alternatively a blank of the grid material placed in the mold and the excess trimmed after removal of the mold.

Referring to FIG. 3, the bead 14 is formed preferably with a first portion 16 on one side of the grid having a generally circular transverse shape with a second portion 18 of lesser transverse area formed by flowing of the elastomeric material through the grid into a generally rectangular configuration.

Referring to FIG. 7, an alternate embodiment of the bead indicated generally at 140 has the upper portion 160 thereof formed with a plurality of transversely spaced longitudinal grooves 162, 164 formed therein; and, the lower portion 180 has a plurality of longitudinally extending transversely spaced ribs 182, 184 formed thereon.

Referring to FIG. 8, another embodiment of the bead is illustrated generally at 240 and includes an upper bead portion 260 having a plurality of longitudinally extending transversely spaced grooves 262, 264 provided in the first portion 260. Bead 260 has a second portion 280 having a pair of longitudinally extending ribs 282, 284 disposed at the transverse margins of the bead 240. In the embodiment of FIG. 8, the upper or first portion 260 has a generally trapezoidal cross section.

Referring to FIG. 9, another embodiment of the invention indicating generally at 340 has an upper bead portion 360 with a single longitudinal groove 362 formed therein; and, the lower bead portion 380 of bead 340 has a single central longitudinally extending groove 382 provided therein.

Figure 4:
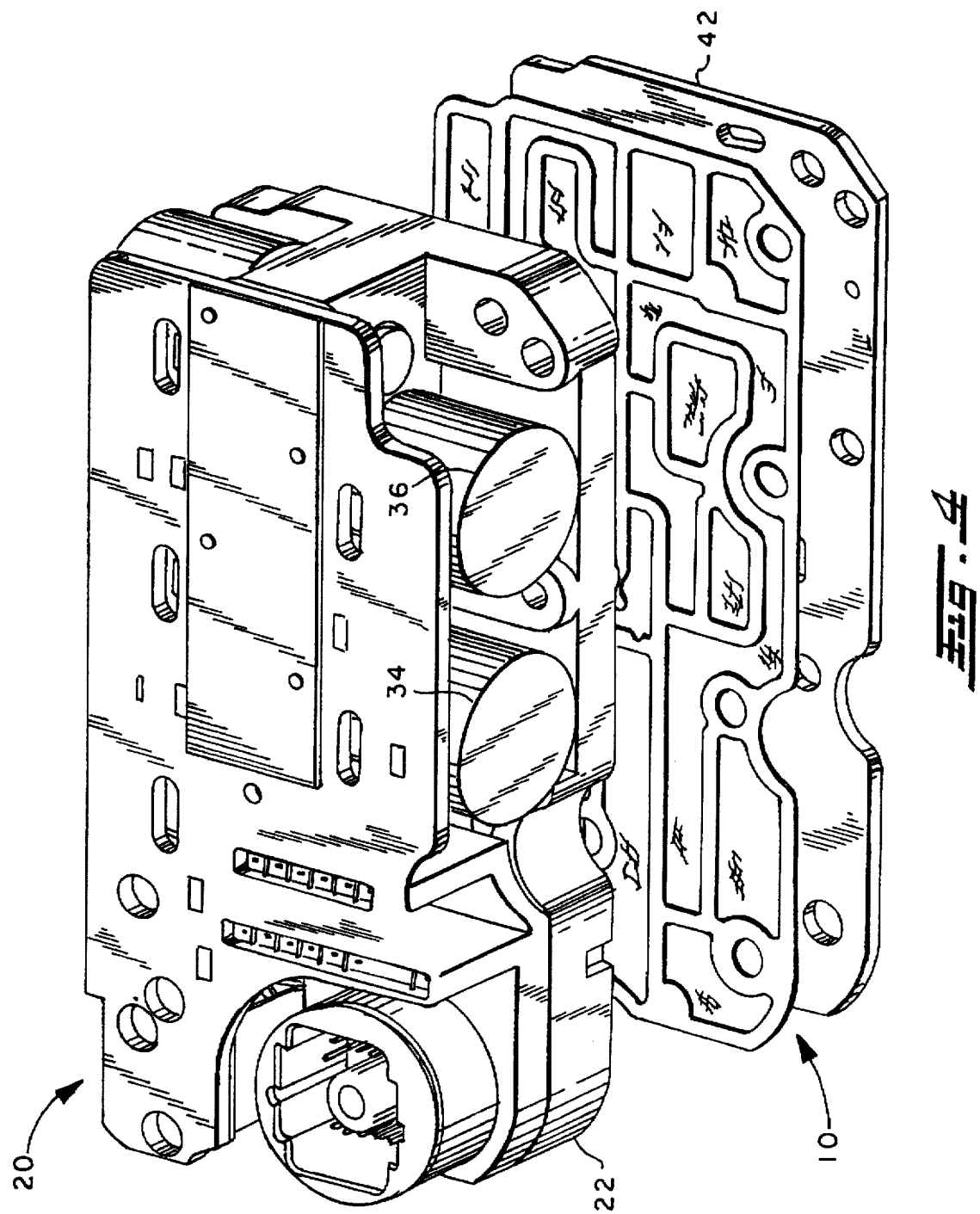
FIG. 4 is an exploded view looking downwardly from the top of a manifolded valve assembly employing the filter/gasket of FIG. 1.

Referring to FIGS. 4, 5 and 6, a manifolded assembly of motorized valves is indicated generally at 20 and includes a manifold block 22 having a plurality of motorized valves in the form of solenoid valves 24, 26, 28, 30, 32, 34, 36 mounted on the block 22 and having ports such as those denoted by reference numerals 33, 35 in FIG. 5 for valving flow through selected passages in the block.

Referring to FIG. 5, the manifold block has a plurality of valving passages provided on the under side of the block 22 in a somewhat labyrinth arrangement as denoted typically by reference numeral 38. The passages 38 are arranged so as to communicate individually with selected ones of the ports of the individual solenoid valves 24, 26, 28, 30, 32, 34, 36 to provide the desired flow to the selected passage upon energization of any of the solenoid valves. Such an arrangement is known in the art of automatic transmission design.

Referring to FIGS. 4, 5 and 6, the filter/gasket 10 is disposed over the passages 38 in the manifold blocks 22; and, a separator plate having the desired arrangement and location of flow passages thereon, as denoted by reference numerals 40, is received over the filter/gasket 10. Separator plate 42 is secured there over by any suitable expedient as for example clamping with another plate or by threaded fasteners through appropriate holes provided in the manifold block 22 and plate 42, which fasteners have not been illustrated for the sake of simplicity.

Referring to FIG. 6, the undersurface of block 22 has formed therein a plurality of grooves 44 into which is received the upper bead portion 16 of filter/gasket 10. Similarly the upper portion 160 of the embodiment of FIG. 6; the upper portion 260 of the embodiment of FIG. 7 and the upper portion 360 of the embodiment of FIG. 9 would also be received in the groove 44. Although various forms of the bead in the embodiment 10, 140, 240 and 340 have been illustrated, it will be understood that the bead transverse section may be varied as required for any particular sealing requirements. It will also be understood that elastomeric material other than that described herein may be employed as dictated by the sealing requirements for the particular hydraulic fluid.

The present invention thus provides a unique and novel combination filter/gasket for sealing and filtering fluid, particularly hydraulic fluid, and a manifolded array of servo actuated valves employing the filter/gasket. The invention has particularly been found suitable for use in a manifolded arrangement of solenoid valve employed for controlling hydraulic fluid flow in automatic car transmissions used in automotive applications.

Although the present invention has been described hereinabove with respect to the illustrated embodiments, it will be understood that the invention is capable of modification and variation and is limited only by the scope of the following claims.

I claim:

1. A manifold and valve assembly comprising:
   (a) a manifold block having a plurality of inlet passages and a plurality of outlet passages;
   (b) motor actuated valve means disposed on said block and operative upon energization to selectively control flow between said inlet and outlet passages;
   (c) a separator plate having a plurality of cut-outs therein received over said inlet and outlets, said cover plate having said cut-outs communicating with selected ones of said inlets and outlets; and,
   (d) a filter/gasket disposed between said plate and said block and having;
      (i) a grid formed of woven screen material;
      (ii) a bead configured to isolate selected ones of said cut-outs, said bead formed of elastomeric material extending through said grid and forming first and second portions of said bead on opposite sides of said grid at a common location thereon.

2. The assembly defined in claim 1, wherein said bead is formed of material selected from the group consisting of (a) silicone elastomer or (b) fluorocarbon elastomer.

3. The assembly defined in claim 1, wherein said grid is formed from material selected from the group consisting of (a) stainless steel or (b) polyester plastic.

4. The assembly defined in claim 1, wherein said bead is formed of elastomeric material having a hardness in the range 72–78 as measured on the Shone "A" scale.

5. The assembly defined in claim 1, wherein said first portions of said bead have a generally semicircular transverse section.

6. The assembly defined in claim 1, wherein said second portions of said bead have a generally rectangular configuration in transverse section.

7. The assembly defined in claim 1, wherein said motor actuated valve means includes at least one solenoid operated valve.

* * * * *